(12) United States Patent
Liu et al.

(10) Patent No.: US 7,840,522 B2
(45) Date of Patent: Nov. 23, 2010

(54) SUPERVISED RANK AGGREGATION BASED ON RANKINGS

(75) Inventors: Tie-Yan Liu, Beijing (CN); Hang Li, Beijing (CN); Yu-Ting Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 11/682,963

(22) Filed: Mar. 7, 2007

(65) Prior Publication Data
US 2008/0222062 A1 Sep. 11, 2008

(51) Int. Cl.
*G06F 15/18* (2006.01)
(52) U.S. Cl. .................... 706/62; 706/45; 707/705; 707/706; 707/707; 707/723; 707/748
(58) Field of Classification Search ............. 706/45–48, 706/51–52, 62; 707/1–3, 7
See application file for complete search history.

(56) References Cited

U.S. PATENT DOCUMENTS

| | | | |
|---|---|---|---|
| 6,012,053 A * | 1/2000 | Pant et al. ...................... 707/3 |
| 6,289,354 B1 | 9/2001 | Aggarwal et al. | |
| 6,370,527 B1 * | 4/2002 | Singhal .......................... 707/6 |
| 6,526,440 B1 * | 2/2003 | Bharat ........................ 709/219 |
| 7,117,207 B1 | 10/2006 | Kerschberg et al. | |
| 7,167,871 B2 | 1/2007 | Farahat et al. | |
| 7,188,106 B2 | 3/2007 | Dwork et al. | |
| 7,379,947 B2 * | 5/2008 | McSherry ................... 707/102 |
| 7,464,075 B2 * | 12/2008 | McSherry et al. .............. 707/3 |
| 2003/0037074 A1 * | 2/2003 | Dwork et al. ................ 707/500 |
| 2004/0249831 A1 | 12/2004 | Fagin et al. | |
| 2005/0060311 A1 | 3/2005 | Tong et al. | |
| 2005/0216295 A1 | 9/2005 | Abrahamsohn | |
| 2005/0262050 A1 | 11/2005 | Fagin et al. | |
| 2006/0224577 A1 * | 10/2006 | Hullender et al. .............. 707/5 |
| 2007/0112768 A1 * | 5/2007 | Majumder .................... 707/7 |
| 2007/0219993 A1 * | 9/2007 | Laker et al. ................... 707/7 |

OTHER PUBLICATIONS

Hoon et al. "Rank Aggregation Model for Meta Search", Intelligent Information Processing II, 2004, pp. 325-339.*
Dwork et al., "Rank Aggregation Methods for the Web", WWW10, 2001, pp. 613-622.*
Agarwal et al., "Learning to Rank", NIPS 2005, pp. 1-40.*
Burges, "Ranking as Learning Structured Outputs", 2005, pp. 7-11.*

(Continued)

*Primary Examiner*—Donald Sparks
*Assistant Examiner*—Omar F Fernandez Rivas
(74) *Attorney, Agent, or Firm*—Perkins Coie LLP

(57) ABSTRACT

A method and system for rank aggregation of entities based on supervised learning is provided. A rank aggregation system provides an order-based aggregation of rankings of entities by learning weights within an optimization framework for combining the rankings of the entities using labeled training data and the ordering of the individual rankings. The rank aggregation system is provided with multiple rankings of entities. The rank aggregation system is also provided with training data that indicates the relative ranking of pairs of entities. The rank aggregation system then learns weights for each of the ranking sources by attempting to optimize the difference between the relative rankings of pairs of entities using the weights and the relative rankings of pairs of entities of the training data.

16 Claims, 10 Drawing Sheets

OTHER PUBLICATIONS

Ahmad, et al. "Fuzzy Logic Based Rank Aggregation Methods for the World Wide Web", *Proceedings of the International Conference on Artificial Intelligence in Engineering and Technology*, Malaysia, 2002, 363-368.

Aslam, et al. "Models for Metaserach", *Proceedings of the 24th Annual International ACM SIGIR Conference on Research and Development in Information Retrieval.* Sep. 9-12, 2001, New Orleans, Louisiana, USA. © 2001 ACM Press. pp. 276-284.

Dwork, et al. "Rank Aggregation Methods for the Web", *Proceedings of the 10th International World Wide Web Conference.* May 1-5, 2001, Hong Kong, ACP, pp. 613-622.

Fagin, et al. "Efficient Similarity Search and Classification Via Rank Aggregation", *Proceedings of the 2003 ACM SIGMOD International Conference on Management of Data.* San Diego, Jun. 9-12, 2003, San Diego,© 2003 ACM, pp. 301-312.

Laurent, et al. "Semidefinite Programming and Integer Programming", Dec. 17, 2002, 101 pages, Report PNA-R0210, CWI, Amsterdam, Apr. 2002.

Renda, et al. "Web Metasearch: Rank vs. Score Based Rank Aggregation Methods", *Proceedings of the 2003 ACM Symposium on Applied Computing*, Mar. 9-12, 2003, Melbourne, Florida. © 2003 ACM.

Sufyan Beg, et al. "Soft Computing Techniques for Rank Aggregation of the World Wide Web", *World Wide Web—An International Journal*, Kluwer Academic Publishers, vol. 6, Issue 1, Mar. 2003, pp. 5-22.

Beg. "Parallel Rank Aggregation for the World Wide Web", World Wide Web. Kluwer Academic Publishers, vol. 6, Issue 1, 5-22. Mar. 2004.

Tan, et al. "Ordering Patterns by Combining Opinions from Multiple Sources", *KDD '04*, Aug. 22-25, 2004, Seattle, Washington, USA, © 2004 ACM, pp. 695-700.

Van Erp, et al. "Variants of the Borda Count Method for Combining Ranked Classifier Hypotheses", *Proceedings of the 7th International Workshop on Frontiers in Handwriting Recognition.* Amsterdam, 2000, 443-452.

International Search Report and Written Opinion; International Patent Application No. PCT/US2008/056322; Filed: Mar. 7, 2008; Applicant: Microsoft Corporation; Mailed on Jul. 24, 2008.

* cited by examiner

SUPERVISED RANK AGGREGATION BASED ON RANKINGS

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Three well-known techniques for page ranking are PageRank, HITS ("Hyperlink-Induced Topic Search"), and DirectHIT. PageRank is based on the principle that web pages will have links to (i.e., "out links") important web pages. Thus, the importance of a web page is based on the number and importance of other web pages that link to that web page (i.e., "in links"). Web pages and their links can be represented as a web graph. A web graph represents web sites as vertices of the graph and links between web pages of the web sites as edges between the vertices. The edges are directed to differentiate in links and out links. A web graph can be represented as an adjacency matrix A, where $A_{ij}$ represents the number of out links from web page i to web page j. The importance score $w_j$ for web page j can be represented by the following equation:

$$w_j = \Sigma_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following in links and out links. HITS submits a query to a search engine service and uses the web pages of the result as the initial set of web pages. HITS adds to the set those web pages that are the destinations of in links and those web pages that are the sources of out links of the web pages of the result. HITS then calculates the authority and hub score of each web page using an iterative algorithm. The authority and hub scores can be represented by the following equations:

$$a(p) = \sum_{q \to p} h(q)$$

and $$h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

Rank aggregation is a technique that combines results of various rankings on sets of entities (e.g., documents or web pages of a search result) to generate an overall ranking of the entities. For example, a meta-search service may receive a query and submit that query to multiple search engine services. Because the search engine services are likely to find different sets of documents that match the query and to use different ranking functions, the search results of each search engine service will include different documents with different rankings. To combine the results from the different search engine services, the meta-search may use rank aggregation to aggregate the various rankings of the search results to generate an overall ranking.

Rank aggregation can be classified into two categories: score-based aggregation and order-based aggregation. In score-based aggregation, each search engine service provides a score for each entity of its search result. Score-based aggregation combines the scores provided by the search engine services to generate an overall score for each entity and ranks the entities based on the combined scores. In order-based aggregation, each search engine service provides a ranking of the entities within its search result. Order-based aggregation generates an overall ranking based on the ordering of the entities in the rankings without using any score that may be provided by the search engine service.

Order-based aggregation is typically performed without any supervision, that is, without using training data to learn how to weight or combine the orders of the different search engine services. Order-based aggregation includes Borda Count techniques (see, e.g., Dwork, C., Kumar, R., Naor, M., and Sivakumar, D., "Rank Aggregation Methods for the Web," in Proceedings of the 10th International World Wide Web Conference, 2001, pp. 613-622), median rank aggregation techniques (see, e.g., Fagin, R., Kumar, R., and Sivakumar, D., "Efficient Similarity Search and Classification via Rank Aggregation," in Proceedings of the 2003 ACM SIGMOD International Conference on Management of Data, San Diego, 2003, pp. 301-312), genetic algorithms (see, e.g., M. M. Sufyan Beg, Nesar Ahmad, "Soft Computing Techniques for Rank Aggregation on the World Wide Web," World Wide Web—An International Journal, Kluwer Academic Publishers, vol. 6, issue 1, March 2003, pp. 5-22; and M. M. Sufyan Beg, "Parallel Rank Aggregation of the World Wide Web," Proc. International Conference on Intelligent Sensing and Information Processing (ICISIP-2004), Chennai, India, Jan. 4-7, 2004, IEEE Press, pp. 385-390), fuzzy logic techniques (see, e.g., Ahmad, N. and Beg, M. M. S., "Fuzzy Logic Based Rank Aggregation Methods for the World Wide Web," in Proceedings of the International Conference on Artificial Intelligence in Engineering and Technology, Malaysia, 2002, pp. 363-368), and Markov Chain techniques (see, e.g., Dwork, C., Kumar, R., Naor, M., and Sivakumar, D., "Rank Aggregation Methods for the Web," in Proceedings of the 10th International World Wide Web Conference, 2001, pp. 613-622). Because such unsupervised rank-aggregation techniques do not use training data, the accuracy of these techniques is suspect.

SUMMARY

A method and system for rank aggregation of entities based on supervised learning is provided. A rank aggregation system provides an order-based aggregation of rankings of entities by learning weights within an optimization framework for combining the rankings of the entities using labeled training data and the ordering of the individual rankings. The rank aggregation system is provided with multiple rankings of entities. The rank aggregation system is also provided with training data that indicates the relative ranking of pairs of entities. The rank aggregation system then learns weights for each of the ranking sources by attempting to optimize the difference between the relative rankings of pairs of entities using the weights and the relative rankings of pairs of entities of the training data. After the weights are generated, the rank aggregation system can use the weights for subsequent queries to combine the rankings of the various ranking sources. The rank aggregation system may then order the entities of the search results based on the assigned scores.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
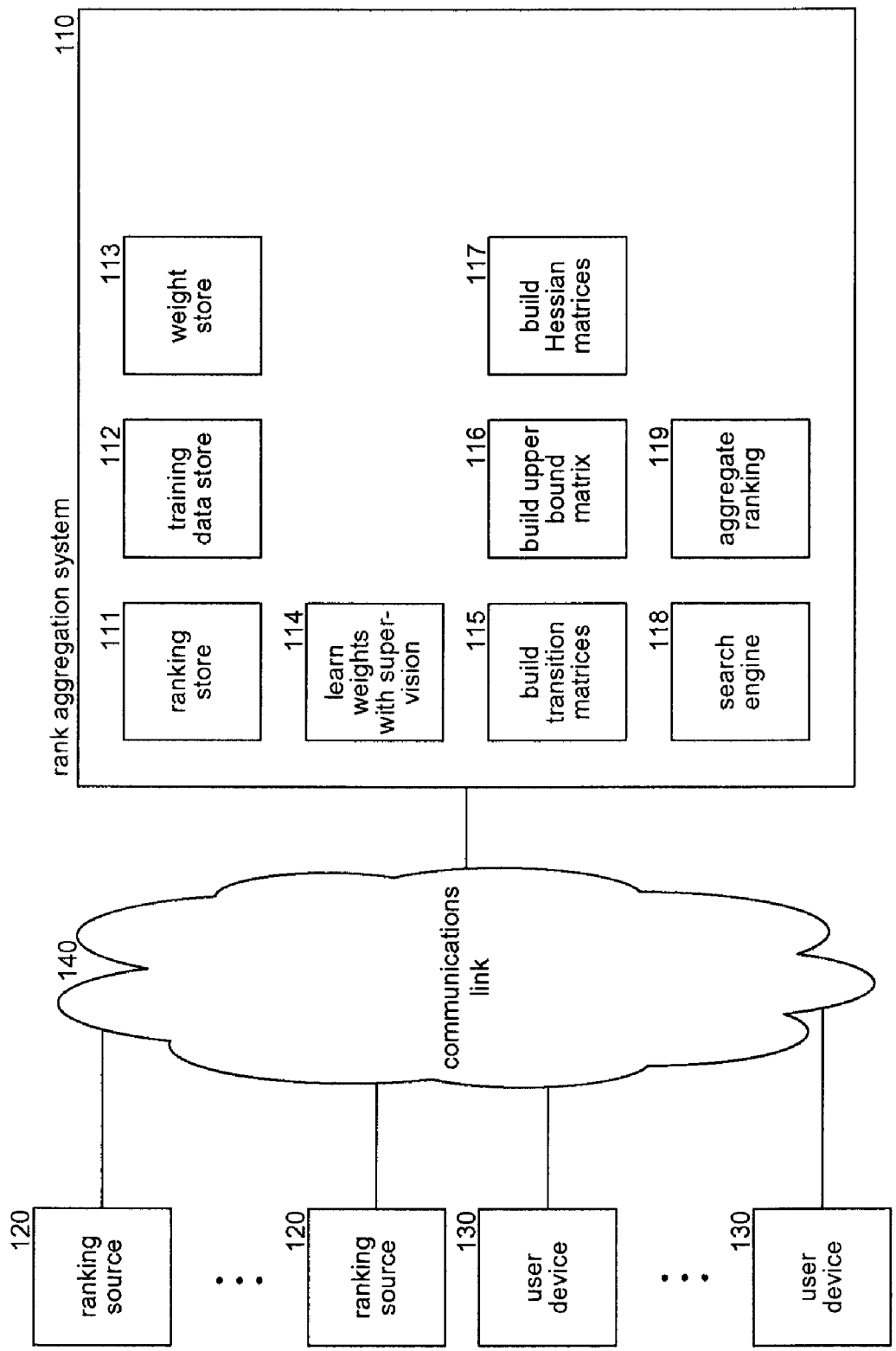
FIG. 1 is a block diagram that illustrates components of the rank aggregation system in one embodiment.

A method and system for rank aggregation of entities based on supervised learning is provided. In one embodiment, a rank aggregation system provides order-based aggregation of rankings of entities by learning weights within an optimization framework for combining the rankings of the entities using labeled training data and the ordering of the individual rankings. The rank aggregation system is provided with multiple rankings of entities. For example, the rank aggregation system may submit multiple queries to each ranking source (e.g., search engine) and store the results of each search in a ranking store. The rank aggregation system is also provided with training data that indicates the relative ranking of pairs of entities. For example, the rank aggregation system may ask reviewers to indicate for the queries what the relative ranking should be for various pairs of entities within the results for the query. The rank aggregation system then learns weights for each of the ranking sources by attempting to optimize the difference between the relative rankings of pairs of entities using the weights and the relative rankings of pairs of entities of the training data. In this way, the rank aggregation system takes advantage of the training data to generate more effective weights for the various ranking sources. After the weights are generated, the rank aggregation system can use the weights for subsequent queries to combine the rankings of the various ranking sources. For example, the rank aggregation system may assign a score to each entity in the results provided by the search engine that is the average of an indication of its order in each result multiplied by the weight learned for the search engine. The rank aggregation system may then order the entities of the search results based on the assigned scores.

In one embodiment, the rank aggregation system represents the learning of weights for the ranking sources as an optimization problem using a Markov Chain model. The rank aggregation system associates the order relationship between entities to a Markov walk on the entities. The states of a Markov chain correspond to the entities to be ranked, and the transitions between states are defined from pairwise order relationships between the entities. The rank aggregation system initializes the individual transition probability matrices for each ranking source. The rank aggregation system then finds the weights for the ranking sources. The rank aggregation system finds weights that result in overall stationary probabilities (e.g., scores) for the entities by attempting to minimize the difference between the relative rankings of the training data and the relative rankings using the weights.

In one embodiment, the rank aggregation system initially represents the optimization problem using an objective function to minimize the difference between relative rankings of the entities of the training data and the corresponding relative rankings of the entities using the weights. The rank aggregation system may represent the set of all possible entities as S. A ranking τ represents a ranking of a subset V of entities S that provides a total order relation for the entities in subset V. The total order relation may be represented by the following:

$$\tau = d_1, \ldots, d_m, \text{ if } d_1 > \ldots > d_m, d_i \epsilon V, i=1, \ldots, m \quad (1)$$

where > represents the relation and m represents the number of entities in V. If V equals S, T is a "full ranking," otherwise, it is a "partial ranking."

The rank aggregation system represents the rankings of subsets of S as the rankings $\tau_1, \ldots, \tau_l$, where n represents the number of entities in S and l represents the number of rankings. The rank aggregation system represents an aggregation function as follows:

$$\Psi : \tau_1, \ldots, \tau_l \mapsto x, \quad (2)$$

where x represents the final score vector of all entities. That is, if $x = \Psi(\tau_1, \ldots, \tau_l)$, then all the entities are ranked by the scores in x.

The rank aggregation system represents the optimization problem as an objective function with constraints or constraint functions as represented by the following:

$$\min_{x,\alpha,t} t^T t$$

$$s \cdot t \cdot x = (\Sigma_{k=1}^l \alpha_k P_k)^T x$$

$$\Sigma_{i=1}^n x_i = 1, x_i \geq 0, i=1, \ldots, n$$

$$\Sigma_{k=1}^l \alpha_k = 1, \alpha_k \geq 0, k=1, \ldots, l$$

$$Hx < t, t \geq 0 \quad (3)$$

where H represents a matrix derived from the training data, $P_k$ represents the individual transition probability matrix for ranking source k, $\alpha_k$ represents the weight for ranking source k, $x_i$ represents the stationary probability for the entity i, t represents the difference between the relative rankings of the training data and the relative ranking using the weights, l represents the number of ranking sources, and n represents the number of entities. The first constraint function is that the overall stationary probability for the entities is generated from the weighted individual transition probability matrices. The second constraint function is that the sum of the weights is one. The third constraint function is that the sum of the stationary probabilities is one. The fourth constraint function is that the difference between the relative rankings of the training data and the relative ranking using the weights is greater than zero.

Matrix H may have a row for each pairwise ranking in the training data and a column for each entity in the training data. For example, if the training data covers four entities, then one relative ranking may indicate that entity 1 should be ranked higher than entity 2, and another relative ranking may indicate that entity 4 should be ranked higher than entity 3. The corresponding matrix H is represented by the following:

$$H = \begin{bmatrix} -1 & 1 & 0 & 0 \\ 0 & 0 & 1 & -1 \end{bmatrix} \quad (4)$$

The first row indicates that entity 1 with a value of −1 should be ranked higher than entity 2 with a value of 1. The second row indicates that entity 4 with a value of −1 should be ranked higher than entity 3 with a value of 1. The rank aggregation system may represent the constraint function in which all relative rankings of the training data are satisfied by the following:

$$Hx < 0 \quad (5)$$

where $x = (x_1, x_2, x_3, x_4)^T$ represents the stationary probabilities of the entities. For example, if the combined stationary probabilities for the four entities are (0.4, 0.1, 0.2, 0.3), then the result of Hx will be (−0.3, −0.1). Since each element of the result is less than zero, all the relative rankings of the training data are satisfied (i.e., 0.4 is greater than 0.1 and 0.3 is greater than 0.2). In contrast, if the combined stationary probabilities for the four entities are (0.1, 0.4, 0.2, 0.3), then the result of Hx will be (0.3, −0.1). Since the first element of the result is greater than zero, not all the relative rankings of the training data are satisfied (i.e., 0.1 is less than 0.4). Since there may be situations in which it is not possible to have a set of weights that satisfies all the relative rankings of the training data, the rank aggregation system introduces a "slack" variable t and represents this constraint function as follows:

$$Hx < t, t \geq 0 \quad (6)$$

One skilled in the art will appreciate that other constraint functions can be defined to represent the difference between the relative ranking of the training data and the relative ranking using the weights. For example, the threshold could be more than a certain percentage of the relative rankings of the training data that need to be satisfied.

Since the objective function and the constraint functions of Equation 3 are not both convex, the rank aggregation system reformulates the optimization problem so that it is convex. To convert to a convex optimization problem, the rank aggregation system adds the first constraint function to the objective function as represented by the following:

$$\min_{x,\alpha,t} t^T t + \|(\Sigma_{k=1}^l \alpha_k P_k)^T x - x\|_1$$

$$s \cdot t \cdot \Sigma_{i=1}^n x_i = 1, x_i > 0, i=1, \ldots, n$$

$$\Sigma_{k=1}^l \alpha_k = 1, \alpha_k \geq 0, k=1, \ldots, l$$

$$Hx < t, t \geq 0 \quad (7)$$

where $\|\cdot\|_1$ represents the $l_1$-norm of a vector.

The second part of the objective function of Equation 7 corresponding to the constraint that was added is, however, not differentiable. As a result, conventional gradient-based techniques cannot be used to solve the problem. To overcome this difficulty, the rank aggregation system transforms the optimization problem by replacing the second part with an upper bound of the second part that is differentiable. The transformed optimization problem can be represented by the following:

$$\min_{x,\alpha,t} t^T t + 2 - 2\alpha^T A x$$

$$s \cdot t \cdot \Sigma_{i=1}^n x_i = 1, x_i > 0, i=1, \ldots, n$$

$$\Sigma_{k=1}^l \alpha_k = 1, \alpha_k \geq 0, k=1, \ldots, l$$

$$Hx < t, t \geq 0 \quad (8)$$

where A is represented by the flowing equation:

$$A = \begin{pmatrix} p_{11}^{(1)} & \cdots & p_{nn}^{(1)} \\ \vdots & \ddots & \vdots \\ p_{11}^{(l)} & \cdots & p_{nn}^{(l)} \end{pmatrix} \quad (9)$$

The rank aggregation system reformulates Equation 9 as the following:

$$\min_\beta \beta^T H_0 \beta \quad (10)$$
$$s.t.\ H_1 \beta \leq 0$$
$$H_2 \beta = e_2$$
$$H_3 \beta < 0$$

$$H_0 = \begin{pmatrix} 0 & -A & 0 \\ -A^T & 0 & 0 \\ 0 & 0 & 1 \end{pmatrix} \in R^{(l+n+m)\times(l+n+m)}$$

$$H_1 = \begin{pmatrix} -1_l & 0 & 0 \\ 0 & 0 & -1_m \end{pmatrix} \in R^{(l+m)\times(l+n+m)}$$

$$H_2 = \begin{pmatrix} e_l^T & 0 & 0 \\ 0 & e_n^T & 0 \end{pmatrix} \in R^{2\times(l+n+m)}$$

$$H_3 = (\ 0\quad H\quad -1_m\ ) \in R^{m\times(l+n+m)}$$

where $\beta = (\alpha_1, \ldots, \alpha_l, x_1, \ldots, x_n, t_1, \ldots, t_m)^T$, $t_i$ represents the difference corresponding to the pairwise ranking represented by row i of matrix H, m represents the number of rows in matrix H, $I_i$ represents an i-order identity matrix, $e_i$ represents an i-order vector with all elements equal to one, and the constant in the objective function has been omitted.

The optimization problem of Equation 10 has a quadratic objective function with linear constraint functions. Since the Hessian matrix $H_0$ is not positive definite, it is computationally complex to find the solution. Therefore, the rank aggregation system transforms the optimization problem into a semidefinite programming problem as represented by the following:

$$\max_{\lambda,\gamma} \quad (11)$$
$$\gamma$$
$$s.t.\ \lambda \geq 0$$

$$\begin{pmatrix} H_0 + \lambda_0 D & \frac{1}{2} U^T \\ \frac{1}{2} U & -\Lambda_2^T e_2 - 2\lambda_0 - \gamma \end{pmatrix} \succ 0$$

where $U = \Lambda_1^T H_1 + \Lambda_2^T H_2 + \Lambda_3^T H_3$, $\lambda = (\lambda_0, \Lambda_1^T, \Lambda_2^T, \Lambda_3^T)^T$, $\Lambda_1 = (\lambda_1, \lambda_2, \ldots \lambda_{l+m})^T$, $\Lambda_2 = (\lambda_{l+m+1}, \lambda_{l+m+2})^T$, and $\Lambda_3 = (\lambda_{l+m+3}, \lambda_{l+m+4}, \ldots, \lambda_{l+2m+2})^T$.

The rank aggregation system the solves this problem using techniques of semidefinite programming such as the interior point method SDPA as proposed in Fujisawa, K., Fukuda, M., Kojima, M., and Nakata, K., "Numerical Evaluation of the SDPA (SemiDefinite Programming Algorithm)," High Performance Optimization, Kluwer Academic Press, pp. 267-301, 2000. After solving the problem, the rank aggregation system calculates β from λ as represented by the following:

$$\beta = -\frac{1}{2}(H_0 + \lambda_0 D)^{-1} U^T \quad (12)$$

FIG. 1 is a block diagram that illustrates components of the rank aggregation system in one embodiment. The rank aggregation system 110 is connected to various ranking sources 120 and user devices 130 via communications link 140. The rank aggregation system includes a ranking store 111, a training data store 112, and a weight store 113. The ranking store contains the rankings of entities returned as results of various queries that were submitted to the ranking sources. The training data store contains the relative rankings of pairs of entities. The weight store contains the weights learned by the rank aggregation system for each of the ranking sources. The rank aggregation system also includes a learn weights with supervision component 114, a build transition matrices component 115, a build upper bound matrix component 116, and a build Hessian matrices component 117. The learn weights with supervision component controls the learning of the weights by invoking the build transition matrices component, the build upper bound matrix component, and the build Hessian matrices component. The learn weights with supervision component also invokes a component to apply an interior-point semidefinite programming algorithm. The build transition matrices component builds the transition probability matrix for each ranking source using the rankings of the ranking store. The build upper bound matrix component builds the upper bound matrix for the objective function. The build Hessian matrices component builds the Hessian matrices for the semidefinite programming optimization problem. The rank aggregation system may also include a search engine component 118 and an aggregate ranking component 119. The search engine component may receive a query, submit the query to various ranking sources, and invoke the aggregate ranking component to generate a ranking for the entities identified by the ranking sources. The aggregate ranking component generates an aggregate ranking of the entities using the weights of the weight store that were generated by the learn weights with supervision component.

The computing device on which the rank aggregation system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the rank aggregation system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the rank aggregation system may be implemented and used in conjunction with various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The rank aggregation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, separate computing systems may collect the rankings, input the relative rankings of the training data, learn the weights, and perform the rank aggregation for searches.

Figure 2:
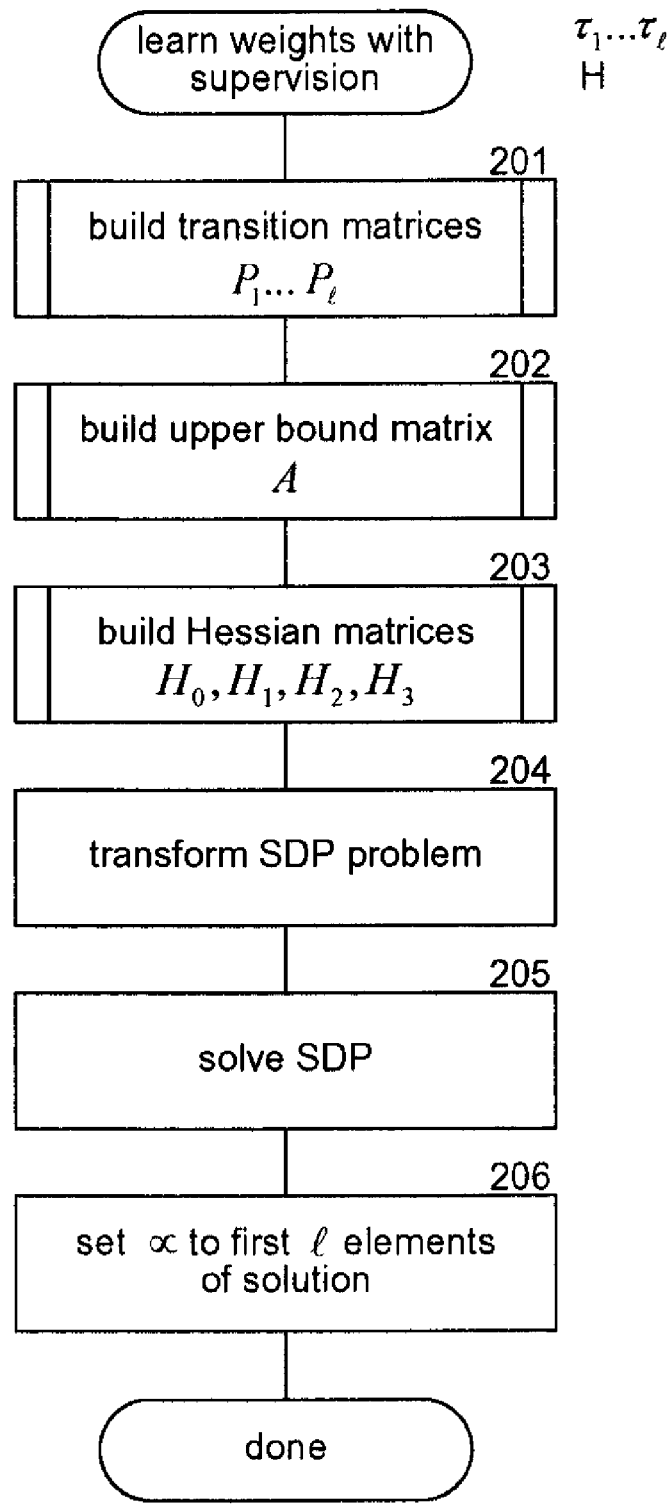
FIG. 2 is a flow diagram that illustrates the processing of the learn weights with supervision component of the rank aggregation system in one embodiment.

FIG. 2 is a flow diagram that illustrates the processing of the learn weights with supervision component of the rank aggregation system in one embodiment. The component is passed the rankings of the ranking sources along with the relative rankings of the training data. The component learns weights for aggregating the rankings and attempts to minimize the difference between the relative rankings of the training data and the relative rankings using the weights. In block 201, the component invokes the build transition matrices component to build a probability transition matrix for each ranking source. In block 202, the component invokes the build upper bound matrix component to build the upper bound matrix of the quadratic objective function and linear constraint functions of the optimization problem as represented by Equations 8 and 9. In block 203, the component invokes the build Hessian matrices component to build the matrices for the semidefinite programming version of the optimization problem as represented by Equation 10. In block 204, the component constructs matrix U as represented by Equation 11. In block 205, the component solves the semidefinite programming version of the optimization problem as represented by Equation 11 using an interior point method. In block 206, the component solves for β as represented by Equation 12 and sets the weights to the first elements of the solution. The component then completes.

Figure 3:
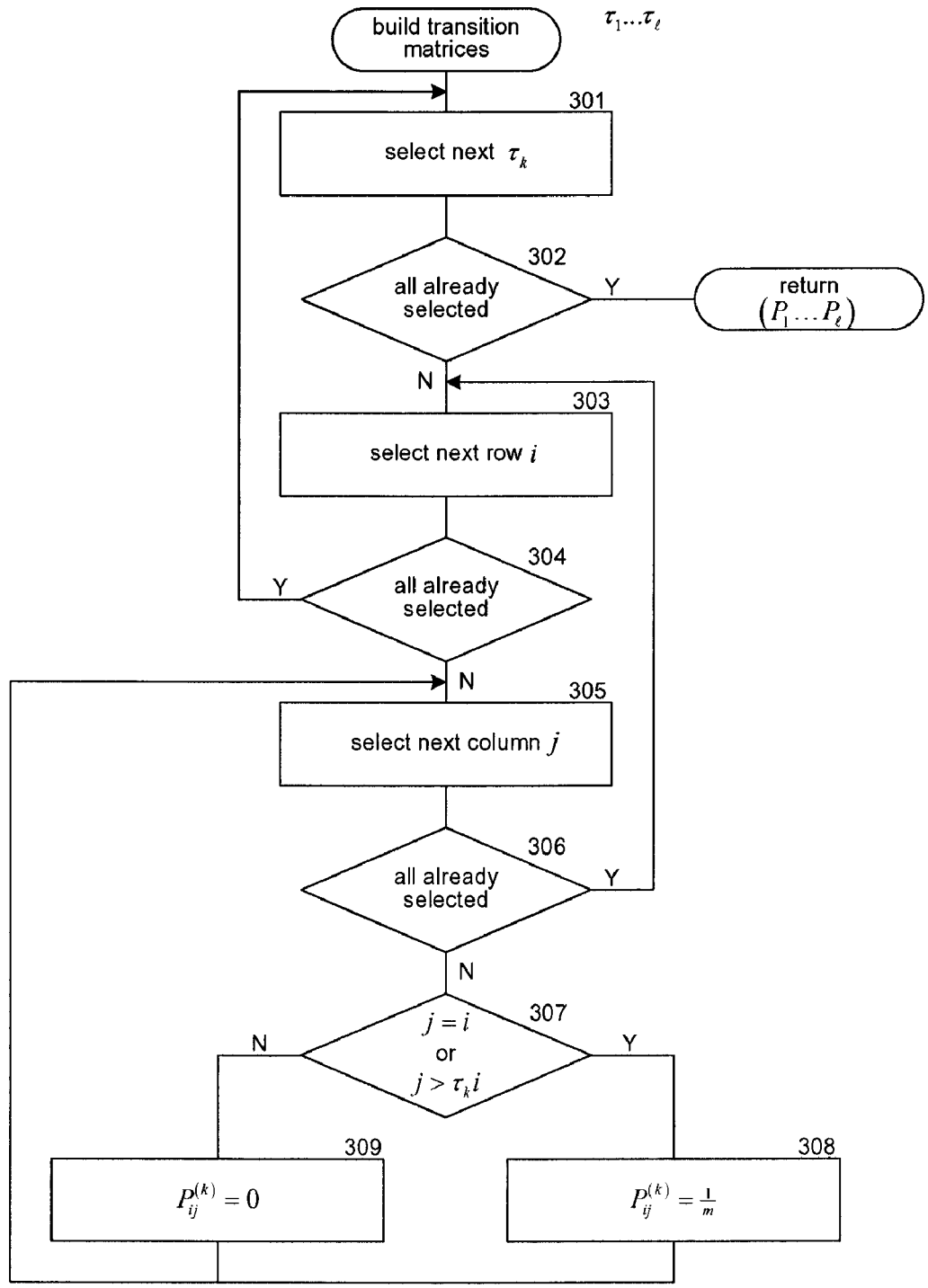
FIG. 3 is a flow diagram that illustrates the processing of the build transition matrices component of the rank aggregation system in one embodiment.

FIG. 3 is a flow diagram that illustrates the processing of the build transition matrices component of the rank aggregation system in one embodiment. The component is passed the rankings and, for each ranking, builds a transition probability matrix, which has a row and a column for each entity. In block 301, the component selects the next ranking. In decision block 302, if all the rankings have already been selected, then the component returns the transition probability matrices, else the component continues at block 303. In block 303, the component selects the next row of the transition probability matrix for the selected ranking. In decision block 304, if all the rows have already been selected, then the component loops to block 301 to select the next ranking, else the component continues at block 305. In block 305, the component selects the next column of the transition probability matrix for the selected ranking. In decision block 306, if all the columns have already been selected, then the component loops to block 303 to select the next row, else the component continues at block 307. In decision block 307, if the selected row and column represent the same entity or if the entity of the selected column is ranked higher than the entity of the selected row by the selected ranking, then the component continues at block 308, else the component continues at block 309. In block 308, the component sets the probability of the selected row and column to one divided by the number of entities. In block 309, the component sets the probability of the selected row and column to zero. The component then loops to block 305 to select the next column.

Figure 4:
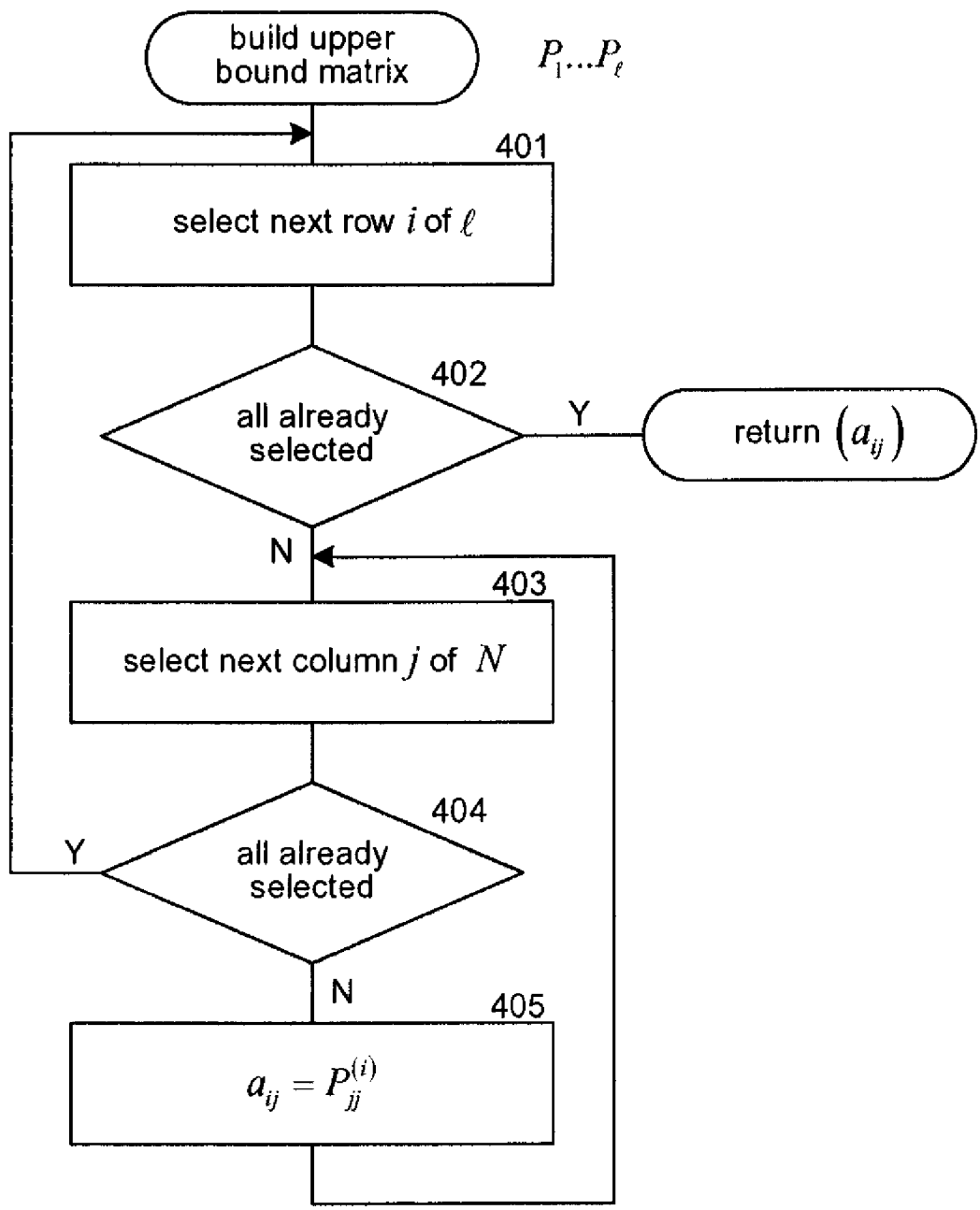
FIG. 4 is a flow diagram that illustrates the processing of the build upper bound matrix component of the rank aggregation system in one embodiment.

FIG. 4 is a flow diagram that illustrates the processing of the build upper bound matrix component of the rank aggregation system in one embodiment. The component is passed the transition probability matrices for the individual ranking sources and generates the upper bound matrix, which has a row for each ranking source and a column for each entity. In block 401, the component selects the next row of the upper bound matrix. In decision block 402, if all the rows have already been selected, then the component returns the upper bound matrix, else the component continues at block 403. In block 403, the component selects the next column of the upper bound matrix. In decision block 404, if all the columns have already been selected, then the component loops to block 401 to select the next row, else the component continues at block 405. In block 405, the component sets the element of the selected row and selected column of the upper bound matrix to the diagonal element indexed by the selected column of the transition probability matrix corresponding to the selected row. The component then loops to block 403 to select the next column.

Figure 5:
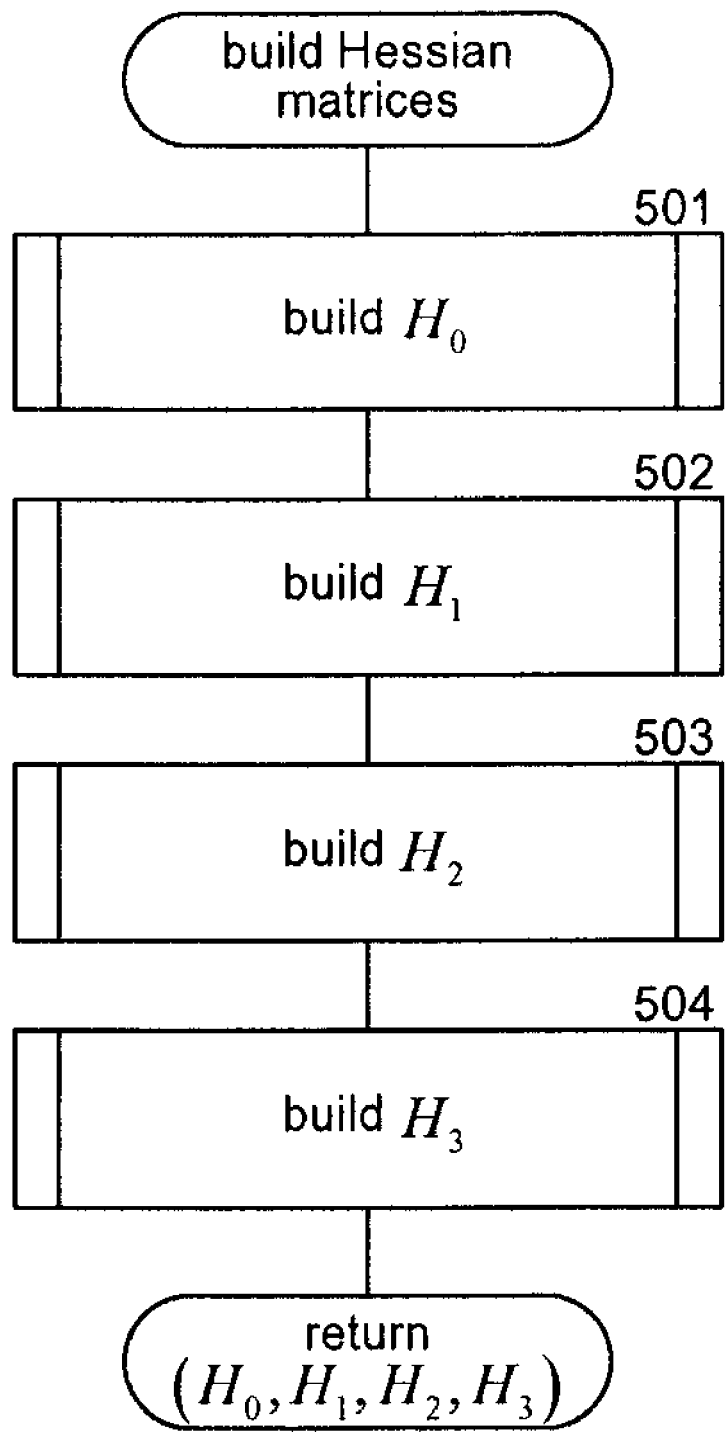
FIG. 5 is a flow diagram that illustrates the processing of the build Hessian matrices component of the rank aggregation system in one embodiment.

FIG. 5 is a flow diagram that illustrates the processing of the build Hessian matrices component of the rank aggregation system in one embodiment. In block 501, the component invokes a build $H_0$ component. In block 502, the component invokes a build $H_1$ component. In block 503, the component invokes a build $H_2$ component. In block 504, the component invokes a build $H_3$ component. The component then returns the Hessian matrices.

Figure 6:
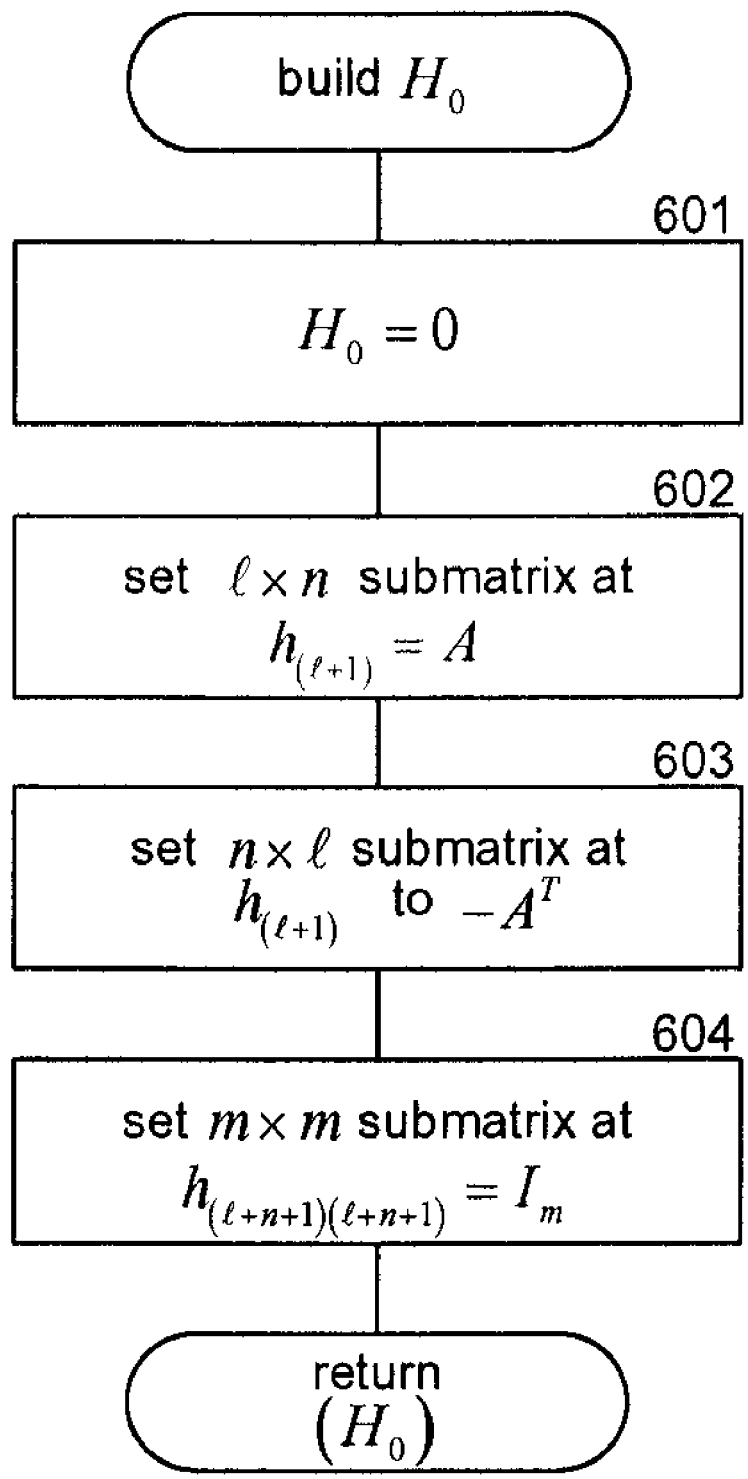
FIG. 6 is a flow diagram that illustrates the processing of the build $H_0$ component of the rank aggregation system in one embodiment.

FIG. 6 is a flow diagram that illustrates the processing of the build $H_0$ component of the rank aggregation system in one embodiment. In block 601, the component initializes the matrix. In block 602, the component sets the sub-matrix of size l×n at $h_{1(l+1)}$ of the matrix to the upper bound matrix. In block 603, the component sets the sub-matrix of the size n×l at $h_{(l+1)1}$ to the transform of the upper bound matrix. In block 604, the component sets the sub-matrix of the size m×m at $h_{(l+n+1)(l+n+1)}$ of the matrix to an identity matrix ($I_m$). The component then returns the matrix $H_0$.

Figure 7:
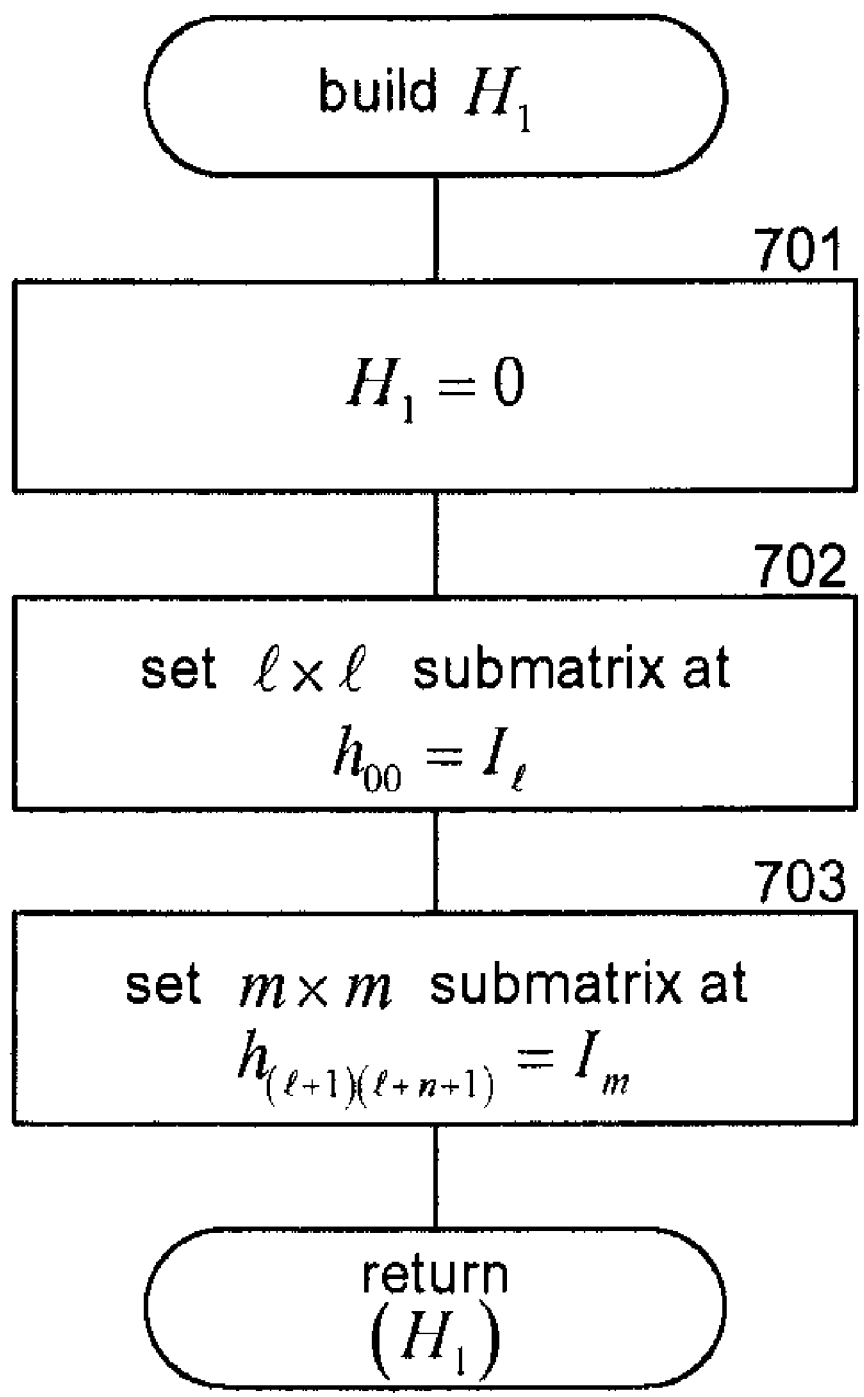
FIG. 7 is a flow diagram that illustrates the processing of the build $H_1$ component of the rank aggregation system in one embodiment.

FIG. 7 is a flow diagram that illustrates the processing of the build $H_1$ component of the rank aggregation system in one embodiment. In block 701, the component initializes the matrix. In block 702, the component sets the sub-matrix of size l×l at $h_{00}$ of the matrix to the negative of an identity matrix ($-I_l$). In block 703, the component sets the sub-matrix of size m×m at $h_{(l+1)(l+n+1)}$ of the matrix to the negative of an identity matrix ($-I_m$). The component then returns.

Figure 8:
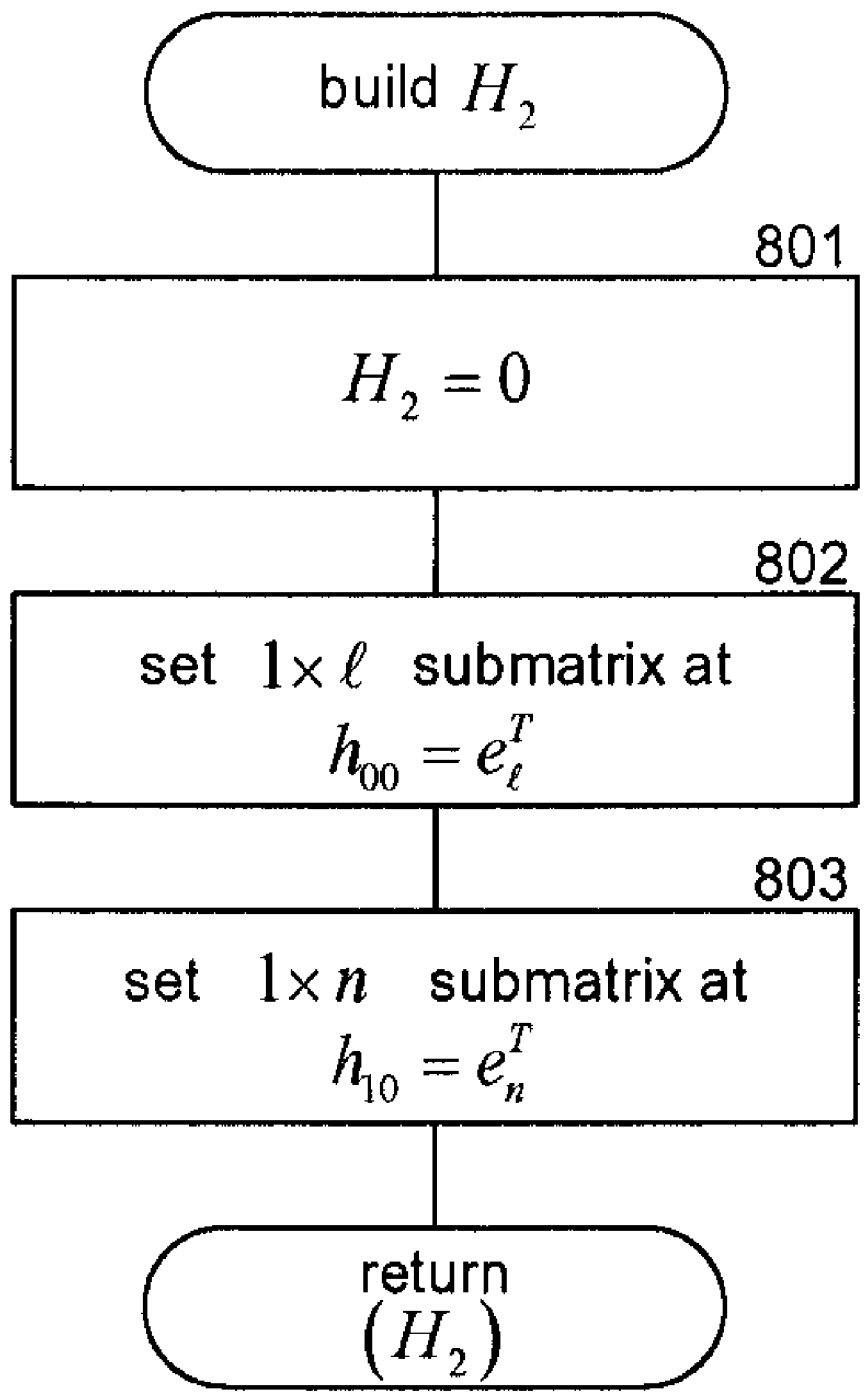
FIG. 8 is a flow diagram that illustrates the processing of the build $H_2$ component of the rank aggregation system in one embodiment.

FIG. 8 is a flow diagram that illustrates the processing of the build $H_2$ component of the rank aggregation system in one embodiment. In block 801, the component initializes the matrix. In block 802, the component sets the sub-matrix of size 1×l at $h_{00}$ of the matrix to the transform of a vector of size l of all ones ($e_l^T$). In block 803, the component sets the sub-matrix of size 1×n at $h_{10}$ of the matrix to the transform of a vector of size n of all ones ($e_n^T$). The component then returns.

Figure 9:
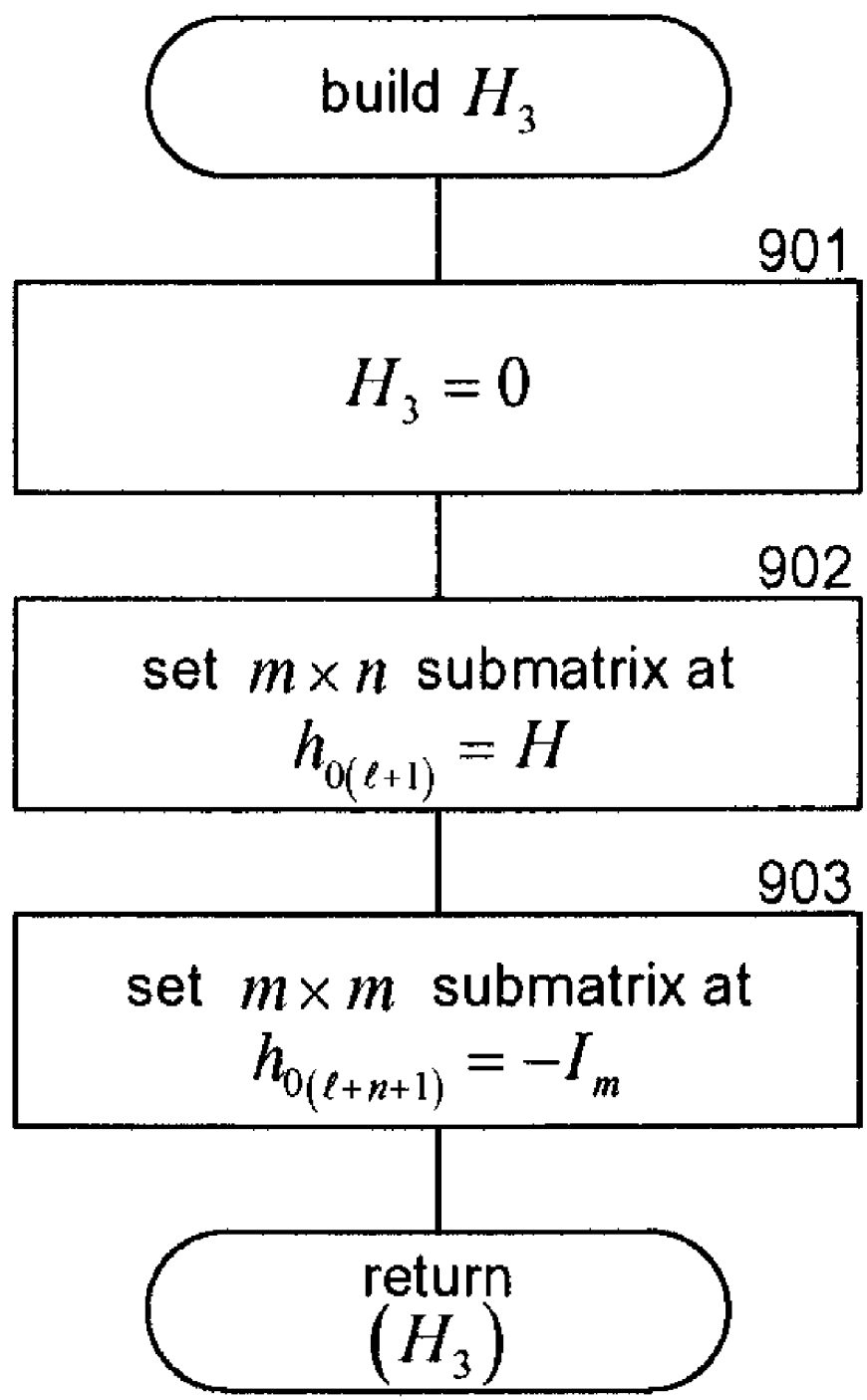
FIG. 9 is a flow diagram that illustrates the processing of the build $H_3$ component of the rank aggregation system in one embodiment.

FIG. 9 is a flow diagram that illustrates the processing of the build $H_3$ component of the rank aggregation system in one embodiment. In block 901, the component initializes the matrix. In block 902, the component sets the sub-matrix of size m×n at $h_{0(l+1)}$ of the matrix to the training data matrix H. In block 903, the component sets the sub-matrix of size m×m at $h_{0(l+n+1)}$ of the matrix to the negative of the identity matrix ($-I_m$). The component then completes.

Figure 10:
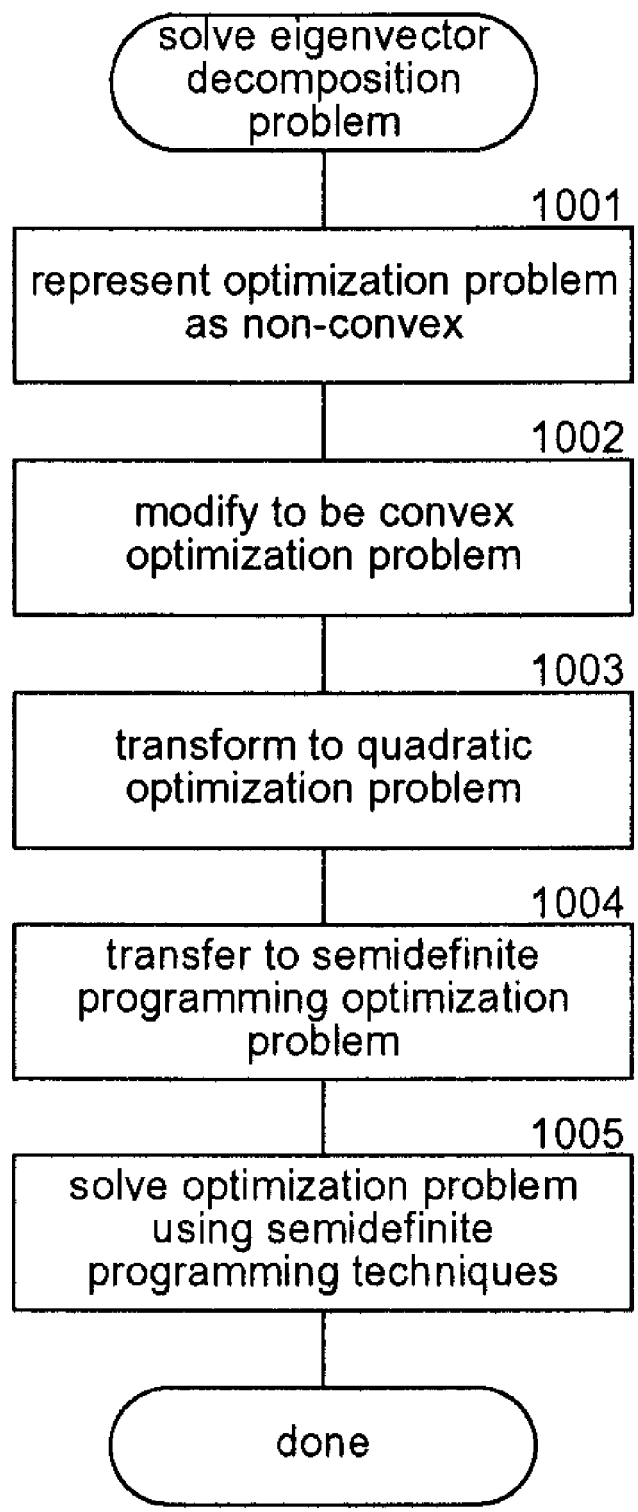
FIG. 10 is a flow diagram that illustrates the processing of a technique that solves an eigenvector decomposition problem.

FIG. 10 is a flow diagram that illustrates the processing of a technique that solves an eigenvector decomposition problem. In block 1001, the technique represents the decomposition problem as a non-convex optimization problem having an objective function and constraint functions. In block 1002, the technique converts the optimization problem into a convex optimization problem by moving a non-convex constraint function to the objective function. In block 1003, the technique transforms the optimization problem into a quadratic optimization problem using an upper bound of the objective function. In block 1004, the technique transforms the optimization problem into a semidefinite programming problem. In block 1005, the technique solves the optimization problem using semidefinite programming techniques. The technique then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the entities can be anything, tangible or intangible, that can be ranked by ranking sources. The entities can be documents, web pages, people, automobiles, relationships, books, movies, music, and so on. Accordingly, the invention is not limited except as by the appended claims.

We claim:

1. A computing device for determining weights for combining results of rankings, comprising:
   a ranking store including multiple rankings for entities, each ranking having a ranking source that provided that ranking of the entities;
   a training data store indicating relative rankings of pairs of entities; and
   a learning component that learns a weight for each of the ranking sources by attempting to minimize the difference between
      the relative rankings of pairs of entities derived from a ranking of the entities generated using the weights of the ranking sources to weight the rankings of the ranking store and
      the relative rankings of pairs of entities of the training data store.

2. The computing device of claim 1 wherein the learning component uses a Markov Chain model.

3. The computing device of claim 2 wherein the learning component initializes an overall transition probability matrix to the sum of ranking transition probability matrices for each ranking.

4. A computing device for determining weights for combining results of rankings, comprising:
   a ranking store including multiple rankings for entities;
   a training data store indicating relative rankings of pairs of entities; and
   a learning component that learns weights for each of the rankings by attempting to minimize the difference between the relative rankings of pairs of entities based on a combination of the rankings using the weights and the relative rankings of pairs of entities of the training data store,
   wherein the learning component uses a Markov Chain model,
   wherein the learning component initializes an overall transition probability matrix to the sum of ranking transition probability matrices for each ranking, and
   wherein the learning component generates a ranking transition probability matrix for a ranking by setting the conditional probability for each pair of entities to the inverse of the number of entities when the first entity of the pair is ranked lower than or equal to the second entity of the pair and to zero otherwise.

5. The computing device of claim 2 wherein the minimizing is represented by an objective function and constraints that are not convex.

6. The computing device of claim 5 including modifying the non-convex objective function and constraints to be convex.

7. The computing device of claim 6 including transforming the convex objective function and constraints into a quadratic minimization problem using an upper bound of the objective function.

8. The computing device of claim 7 including transforming the objective function and constraints from the quadratic minimization problem into a semidefinite programming optimization problem.

9. The computing device of claim 2 wherein the minimizing is represented by an objective function and constraints that are not convex and including modifying the objective function and constraints to be convex, transforming the convex objective function and constraints into a quadratic minimization problem using an upper bound of the objective function, and transforming the objective function and constraints from the quadratic minimization problem into a semidefinite programming optimization problem.

10. A computer-readable medium embedded with instructions for controlling a computing device to determine weights for combining results of rankings, by a method comprising:
    providing multiple rankings for documents;
    providing training data indicating relative rankings of pairs of documents;
    generating an overall transition probability matrix as the sum of ranking transition probability matrices for each ranking, a ranking transition probability matrix for a ranking including a conditional probability for each pair of documents that is the inverse of the number of documents when the first document of the pair is ranked lower than or equal to the second document of the pair and that is zero otherwise; and
    learning weights for each of the rankings by attempting to minimize the difference between the relative rankings of pairs of documents based on a combination of the rankings using the weights and the relative rankings of pairs of documents of the training data.

11. The computer-readable medium of weights of claim 10 wherein the learning initializes an overall transition probability matrix.

12. The computer-readable medium of claim 10 wherein the minimizing is represented by an objective function and constraints that are not convex.

13. The computer-readable medium of claim 12 including modifying the non-convex objective function and constraints to be convex.

14. The computer-readable medium of claim 13 including transforming the convex objective function and constraints into a quadratic minimization problem using an upper bound of the objective function.

15. The computer-readable medium of claim 14 including transforming the objective function and constraints from the quadratic minimization problem into a semidefinite programming optimization problem.

16. The computer-readable medium of claim 10 wherein the minimizing is represented by an objective function and constraints that are not convex and includes modifying the objective function and constraints to be convex, transforming the convex objective function and constraints into a quadratic minimization problem using an upper bound of the objective function, and transforming the objective function and constraints from the quadratic minimization problem into a semidefinite programming optimization problem.

* * * * *